(12) United States Patent
Xia et al.

(10) Patent No.: US 7,912,334 B2
(45) Date of Patent: Mar. 22, 2011

(54) HARSH ENVIRONMENT TEMPERATURE SENSING SYSTEM AND METHOD

(75) Inventors: Hua Xia, Altamont, NY (US); Kevin Thomas McCarthy, Troy, NY (US); Clayton Ming Young, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 73 days.

(21) Appl. No.: 11/857,487

(22) Filed: Sep. 19, 2007

(65) Prior Publication Data

US 2009/0074348 A1   Mar. 19, 2009

(51) Int. Cl.
*G02B 6/04* (2006.01)
(52) U.S. Cl. .......................................... 385/120; 385/12
(58) Field of Classification Search .............. 385/12–14, 385/37; 374/130–131, 161, E11.015–17; 356/478
See application file for complete search history.

(56) References Cited

U.S. PATENT DOCUMENTS

| | | | | |
|---|---|---|---|---|
| 2,844,637 | A * | 7/1958 | Borel et al. ................... | 136/232 |
| 3,597,920 | A * | 8/1971 | Wadman ....................... | 60/39.52 |
| 4,569,228 | A * | 2/1986 | Bellgardt et al. ............. | 73/866.5 |
| 4,624,128 | A * | 11/1986 | Pelton .......................... | 73/19.07 |
| 4,662,216 | A * | 5/1987 | Kessel ......................... | 73/112.01 |
| 4,977,001 | A * | 12/1990 | Greenspan .................. | 428/34.6 |
| 5,061,035 | A | 10/1991 | Rogers, Jr. | |
| 5,157,753 | A | 10/1992 | Rogers, Jr. | |
| 5,371,365 | A * | 12/1994 | Watanabe et al. ............. | 250/306 |
| 5,474,618 | A * | 12/1995 | Allaire ......................... | 136/234 |
| 5,510,895 | A * | 4/1996 | Sahagen ....................... | 356/436 |
| 5,520,461 | A * | 5/1996 | Curry et al. .................... | 374/179 |
| 5,662,418 | A * | 9/1997 | Deak et al. ..................... | 374/144 |
| 5,767,411 | A | 6/1998 | Maron | |
| 5,872,876 | A * | 2/1999 | Kluth et al. ..................... | 385/12 |
| 6,004,639 | A * | 12/1999 | Quigley et al. .............. | 428/36.3 |
| 6,087,655 | A * | 7/2000 | Kobrin ....................... | 250/237 G |
| 6,211,964 | B1 * | 4/2001 | Luscombe et al. ............ | 356/477 |
| 6,439,055 | B1 | 8/2002 | Maron et al. | |
| 6,442,304 | B1 | 8/2002 | Crawley et al. | |
| 6,552,355 | B1 * | 4/2003 | Green .......................... | 250/573 |
| 6,706,348 | B2 * | 3/2004 | Quigley et al. .............. | 428/36.3 |
| 6,813,013 | B2 | 11/2004 | Fernald et al. | |

(Continued)

FOREIGN PATENT DOCUMENTS

JP          01052011 A  *  2/1989

(Continued)

OTHER PUBLICATIONS

V.P. Wnuk, A. Mendez, S. Ferguson; "Process for Mounting and Packaging of Fiber Bragg Grating Strain Sensors for use in Harsh Environment Applications"; Smart Structures Conference 2005, SPIE paper 5758-6; 8Pages.

*Primary Examiner* — Charlie Peng
*Assistant Examiner* — Peter Radkowski
(74) *Attorney, Agent, or Firm* — Francis T. Coppa

(57) ABSTRACT

A gasification distributed temperature sensing system is disclosed. The sensing system includes a gasification vessel and a harsh environment fiber sensing cable package disposed within the gasification vessel, the sensing cable package includes a thermally conductive enclosure and at least one sensor cable including a distributed array of high-temperature fiber Bragg grating sensors, wherein the sensors are disposed and hermetically sealed within the thermally conductive enclosure.

23 Claims, 16 Drawing Sheets

U.S. PATENT DOCUMENTS

| | | |
|---|---|---|
| 6,907,164 B2 | 6/2005 | Lachance et al. |
| 6,923,048 B2 | 8/2005 | Willsch et al. |
| 6,928,202 B2 | 8/2005 | Pickrell et al. |
| 7,017,417 B2 | 3/2006 | Daigle |
| 7,151,872 B1 * | 12/2006 | Xia et al. ............ 385/37 |
| 7,197,934 B2 * | 4/2007 | Wittrisch et al. ............ 73/700 |
| 7,327,472 B2 * | 2/2008 | Riza et al. ............ 356/519 |
| 7,344,528 B1 * | 3/2008 | Tu et al. ............ 606/7 |
| 2002/0071904 A1 * | 6/2002 | Paek et al. ............ 427/163.2 |
| 2002/0085819 A1 * | 7/2002 | Stottlemyer et al. ............ 385/104 |
| 2004/0202401 A1 * | 10/2004 | Berg et al. ............ 385/12 |
| 2004/0223679 A1 | 11/2004 | Pickrell et al. |
| 2005/0226584 A1 * | 10/2005 | Williams et al. ............ 385/130 |
| 2006/0153487 A1 | 7/2006 | McLellan et al. |
| 2006/0250683 A1 * | 11/2006 | Balan ............ 359/341.1 |
| 2006/0251147 A1 * | 11/2006 | Balan ............ 374/152 |
| 2007/0104435 A1 * | 5/2007 | Ramachandran ............ 385/124 |
| 2007/0201793 A1 * | 8/2007 | Askins et al. ............ 385/37 |
| 2007/0237473 A1 * | 10/2007 | Chen et al. ............ 385/115 |
| 2008/0084913 A1 * | 4/2008 | Perales et al. ............ 374/131 |
| 2008/0192803 A1 * | 8/2008 | Riza et al. ............ 374/161 |
| 2008/0297808 A1 * | 12/2008 | Riza et al. ............ 356/503 |
| 2010/0128284 A1 * | 5/2010 | Riza et al. ............ 356/519 |

FOREIGN PATENT DOCUMENTS

| | | | |
|---|---|---|---|
| JP | 05072048 A | * | 3/1993 |
| JP | 2000054013 | * | 2/2000 |
| WO | 03/076887 A1 | | 9/2003 |

* cited by examiner

HARSH ENVIRONMENT TEMPERATURE SENSING SYSTEM AND METHOD

BACKGROUND

The invention relates generally to fiber optic sensing systems and sensing methods for harsh environments.

Steady and transient temperature measurements are required in various industrial applications, including extremely harsh environments such as turbine engines, combustion cells, and power plants. Non-limiting examples of harsh environments include coal gasifiers and radiant syngas cooler vessels where the transient temperature typically ranges from 1000° F. to 3000° F. (~537° C. to 1648° C.), with a pressure greater than 500 psi (~3.45 MPa). Conventional sensors are often difficult to use in such harsh environments due to the high temperatures, the presence of highly corrosive agents ($H_2S$, $SO_2$, $H_2O$), the electromagnetic interference that may be present in these environments, or combinations thereof.

HTFBG (high temperature fiber Bragg gratings) are highly desirable for multi-point temperature profile measurements due to their advantages in low mass, low specific heat, multiplexing, multi-point distribution, and electromagnetic interference immunity. However, the operation within a gasifier environment, characterized by high temperature, pressure, turbulence, and corrosion, shortens the lifetime of the fiber sensors. In harsh environments, the fiber HTFBG sensors have to be protected not only for providing a desirable surviving rate but also for providing reliability in these environments.

For high-temperature, high-pressure, high-radiation, high-electromagnetic interference, and high-corrosive industrial environments, such as gas/steam turbines, engines, gasifiers, and nuclear reactor vessels, there is currently no practical solution for using the fiber sensors without the sensors experiencing detrimental effects. There are no commercially available fiber temperature sensing cables and systems that can be installed in a harsh environment such as a gasifier or radiant syngas cooler vessel where the steady and transient temperatures could be higher than 2000° F. (~1093° C.) and pressures greater than 500 psi (~3.45 MPa).

A bare fiber sensor cannot be installed in a harsh environment. This is not only due to its fragility but also due to the detrimental effect of corrosive gases, moisture, and acidic and alkaline chemicals attacking the fiber sensor. Polymeric coatings such as acrylate, polyimide, silicone, and carbon, are commonly used fiber cable packaging materials that could allow the fiber and fiber sensors to be deployed in a mild environment where the temperature, pressure, corrosion, and moisture are not of significant concern. Metalized fibers and metal-coated fiber sensors are advanced solutions used for harsh environment applications due to high mechanical strength being provided by the metal coating material. The metal coating materials, such as Al, Ni, TiNi, and Au, allow the fiber or fiber sensor to tolerate temperatures up to 1000° F. (~537° C.). Above 1000° F., however, the mismatched thermal expansion properties that induce interfacial stress and strain between the fiber material and metal coating material quickly degrade the fiber sensor performance and cause poor sensor reliability.

HTFBG sensors have to be packaged before they are installed in or embedded into a structure. Potentially, the packaging of the sensor could protect the sensor from damage due to the hazardous environment and raise the surviving rate of the sensor during the installation and service life. For packaged fiber HTFBG sensors, durability and life span of the fiber HTFBG sensors are not only dependent on the fiber HTFBG sensor itself but also on the packaging materials and package methods.

The most commonly used packaged fiber temperature sensors, such as internal and external Fabry-Perot interferometer-based devices, are metal/ceramic packaged point sensors. It is difficult to cascade and distribute these fiber temperature sensors in a large-scale industrial environment where the temperature is normally higher than 1000° F. (~537° C.) and the pressure greater than 500 psi (~3.45 MPa). The limitations are due use of polymer-based package materials, use of adhesive materials, or mismatched thermal and mechanical properties with metal and ceramic material-based packages.

Most commonly used package materials include either stainless steel or glass/ceramic capillaries or tubes. The fiber and fiber sensors are sealed inside the capillary or tube for protection. For sensing applications such as downhole, borehole, and wellbore, oil, gas and geothermal wells, the fiber sensor sealed capillary or tube is embedded into a structure. And the capillary or tube either needs to either be filled with low-compressibility liquid or solid for reducing vibration attenuation for external pressure detection or be filled with high-thermal conductive liquid for external temperature detection. The temperature limits for packaged sensors to be operated in such harsh environments are typically between 400° F. (~204° C.) and 600° F. (~315° C.).

BRIEF DESCRIPTION

The harsh environment conditions of a gasifier or a radiant syngas cooler vessel require more robust fiber sensor packaging. It would also be useful to have a sensor package that is easily deployable inside the gasifier or radiant syngas cooler for measuring steady and transient temperature profiles or thermal dynamics. The fiber sensor package and its installation should survive the initial thermal blast at the gasification startup moment. The thermal ramping of the gasification thermal blast could be in the range of 400° F./min (~204° C./min) to 800° F./min (~426° C./min), for example, and the transient temperature could increase in the range of 400° F. (~204° C.) to 3000° F. (~1648° C.). Considering the coal gasification induced release of corrosive gases such as $H_2S$, CO, $H_2O$, and $SO_2$, the fiber sensing cable should be hermetically sealed not only for a reliable steady and transient temperature profile mapping but also for maintaining strong mechanical strength against thermal blast from hot gas and coal slurry.

A harsh environment, such as a coal gasifier or a radiant syngas cooler vessel, could have horizontal and vertical temperature distribution, which could introduce a radial or a vertical temperature gradient across the fiber sensing cable. The vertical temperature distribution may also induce thermal convection by packaged tubing medium (filled air, gas, or liquid, for example) up and down circulation. The transient temperature profile mapping depends mainly upon the thermal radiation, conduction, and convection effects. In the temperature sensing application of the downhole, borehole, and wellbore, oil, gas and geothermal wells, the thermal conduction is a primary effect. The thermal radiation and convection have little effect on the measured steady temperature accuracy. However, thermal radiation, such as from hot gasses or flames produced in the gasification process, can be absorbed by the fiber sensing cable. This could lead to local heat transfer by both conduction and radiation inside the fiber sensing cable. As such, it becomes critical requirement to shield the fiber sensing cable against thermal radiation effects from such a harsh environment.

When used in gasification systems, apart from the requirement to survive transient thermal blasts from a harsh environment, a fiber sensing cable also is required to maintain constant mechanical strength for long-term reliable operation. The hot sections of the fiber sensing cables deployed inside a harsh environment should be effectively protected by thermal shielding material to protect both the fiber sensing cable and fiber HTFBG sensors against extremely temperature induced fiber and package materials elastic strength degradation.

Therefore, there is a need for providing a field deployable, hermetically packaged fiber sensing cable, a sensing system, and installation method typically for a distributed, steady and dynamic temperature profile mapping in an extremely harsh environment.

One embodiment of the present invention is a gasification system. The gasification system includes a gasifier unit and a harsh environment fiber sensing cable package disposed within the gasifier unit. The package includes a thermally conductive enclosure and at least one sensor cable comprising a distributed array of fiber Bragg grating sensors. The sensors are disposed and hermetically sealed within the thermally conductive enclosure.

Another embodiment of the present invention is a harsh environment temperature sensing fiber sensor package. The harsh environment temperature sensing fiber sensor package includes at least one sensor cable comprising at least one fiber Bragg grating sensor, and a thermally conductive enclosure comprising a reflective material with a melting point greater than 2000° F. (~1093° C.), wherein the material reflects at least 50 percent of incident radiation at wavelengths less than 2 microns, wherein the at least one sensor is disposed and hermetically sealed within the thermally conductive enclosure.

Another embodiment of the present invention is a harsh environment temperature sensor system. The system includes a harsh environment temperature fiber sensor package disposed within the harsh environment, wherein the fiber sensor package comprises a fiber sensor cable at least partially disposed and mechanically supported within a hermetically sealed, thermally conductive high melting point enclosure, wherein the fiber sensor cable comprises one or more fiber Bragg grating sensors and the thermally conductive high melting point enclosure comprises a reflective material with a melting point greater than 2000° F. (~1093° C.), wherein the material reflects at least 50 percent of incident radiation at wavelengths less than 2 microns, an interrogation source disposed external to the harsh environment for generating an interrogation signal, wherein upon interrogation of the fiber sensor cable by the interrogation signal, the sensor generates a response data signal characteristic of a sensed temperature; and a signal acquisition and analysis system, wherein the response data signal is acquired by the data acquisition and analysis system to estimate the sensed temperature.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

"Harsh environment" as defined herein means an environment having a high-temperature (T>500° F.), high-pressure (P>100 psi), high-voltage (>1000V), high-current (>1000A), high-corrosion (pH>10 or pH<4), high-radiation (γ-ray dosage>100 MGy, hot neutron flux>$10^{18}$ n/cm$^2$·s), or combinations. A harsh environment may further include conditions such as high-humidity (RH>90%), high-vibration (f>$10^3$ Hz), high-flow-rate (250 m/s), toxic gases (H$_2$S, CO, SO2, etc), or combinations thereof, for example.

In the following specification and the claims that follow, the singular forms "a", "an" and "the" include plural referents unless the context clearly dictates otherwise.

Figure 1:
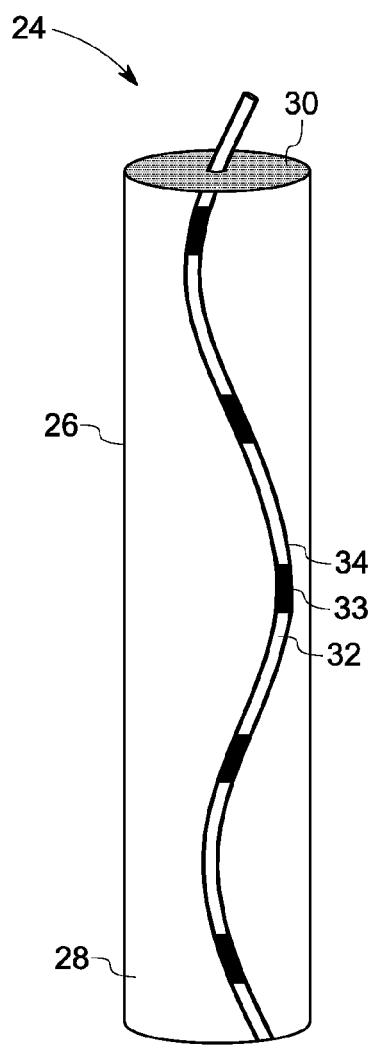
FIG. 1 is a schematic representation of a hermetically sealed sensing cable with one freestanding sensing fiber for vertical deployment in another embodiment disclosed herein.

FIG. 1 illustrates a fiber sensing cable package 24 in one embodiment, including a thermally conductive and highly electromagnetic wave reflective enclosure 26 and a free-standing or stress-free drop-in high-temperature fiber sensing cable 32, hermetically sealed (seal 30) within the enclosure space 28. Examples of thermally conductive and highly reflective enclosure materials include but are not limited to metals and metal alloys such as 310 stainless steel, 304 stainless steel, Hastelloy X, Inconel 600, Incoloy 800, molybdenum, PtRh alloy, Pt, tantalum, titanium or any combination thereof. Table 1 presents the thermal properties of some sample enclosure materials used in some embodiments of the present invention. The table illustrates the advantageous properties of these materials, including high melting points, for example greater than 2300 degree Fahrenheit (~1260 degree Centigrade), high maximum operation temperatures, for example greater than 1600 degree Fahrenheit (~871 degree Centigrade).

TABLE 1

Enclosure material properties.

| Package material | Melting point (MP) ° F. or (MP ° F. − 32) × 0.5555° C. | Maximum Operating Temperature (MOT) ° F. or (MOT ° F. − 32) × 0.5555° C. |
| --- | --- | --- |
| 310 SS | 2560 | 2100 |
| 304 SS | 2560 | 1650 |
| Hastelloy X | 2300 | 2200 |
| Inconel 600 | 2550 | 2100 |
| Incoloy 800 | 2550 | 2100 |
| Molybdenum | 4730 | 4000 |
| PtRh | 3400 | 3000 |
| Pt | 2700 | 2500 |
| Tantalum | 5425 | 4200 |
| Titanium | 3034 | 2000 |

Additionally, parameters such as but not limited to change in mechanical strength with increasing temperature, corrosion effects due to the presence of, for example, sulfur or oxygen, can be taken into account in selecting a material with desirable properties for the enclosure. In one embodiment, the hermetically sealed cable package is operable in environments with temperatures up to 2000° F. (~1093° C.). In a further embodiment, the cable package is operable in environments with temperatures up to 2300° F. (~1260° C.). In a still further embodiment the cable package is operable in environments with temperatures up to 2500° F.(~1371° C.). In some embodiments the cable package is operable in environments with pressures greater than 600 psi (~4.13 MPa).

The fiber sensing cable 30, in the illustrated embodiment of FIG. 1 is a metalized single mode fiber 32, including a plurality of high-temperature fiber Bragg gratings (HTFBG) 33. In one embodiment, the HFTBGs are operable at temperatures greater than 500° F. In a more specific embodiment, the HFTBGs are operable at temperatures greater than 1000° F. The sensing fiber 32 is encased in a metal sheet cylinder or tube 34 for providing mechanical support and protection to the sensing fiber 32, for maintaining sensing reliability, and for providing easier fiber sensor deployment and installation. In one example, the fiber temperature sensors are fiber Bragg gratings (FBG) wherein the refractive index modulation in the fiber Bragg grating is provided by microcrystalline and rigid silicon dioxide tetrahedral structures in the fiber core and a low refractive index cladding material (such as silicon dioxide doped with 100-500 ppm fluorine) disposed circumferentially about the fiber core. The metalized fiber cable is sealed in the highly reflective metal tubing 26 that can be easily deployed in the harsh environment. In one embodiment, the internal diameter of the metal tubing ranges from 0.3 mm to 1.0 mm, and wall thickness of the metal tubing is about 0.5 mm to 1.0 mm. In the other embodiment, the metal tubing is a fully interlocked armored stainless steel or Inconel tubing. The hermetical sealing is provided by a junction box with several representative examples being described below. The metallization of the fiber, for example, is of Al, Cu, Ni, and Au.

Figure 2:
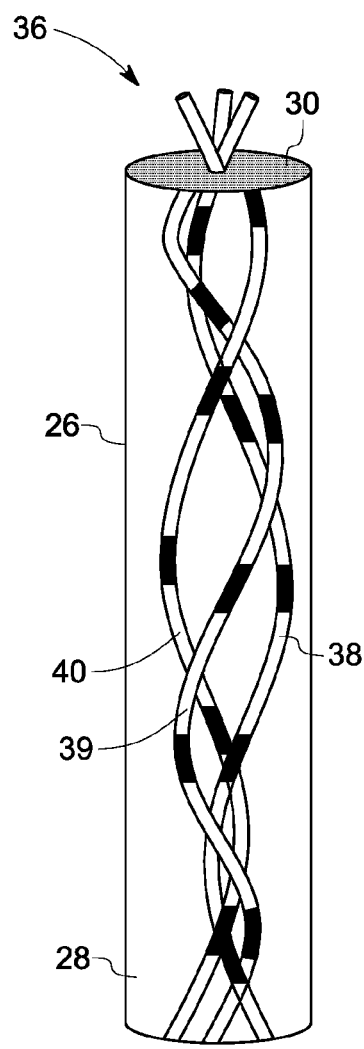
FIG. 2 is a schematic representation of a hermetically sealed sensing cable with multiple freestanding sensing fibers for vertical deployment in another embodiment disclosed herein.

FIG. 2 illustrates a sensor cable package 36 in one embodiment, including a thermally conductive enclosure 26 and a plurality of high-temperature fiber sensor cables 38, 39, 40, hermetically sealed (seal 30) within the enclosure space 28. The fiber sensing cables 38, 39, 40 in the illustrated embodiment of FIG. 2 are polymerized fibers and are disposed within the enclosure in a twisted configuration. Twisting is expected to provide mechanical self-support and to rigidly position the fiber sensing cables with the enclosure space 28. Non-limiting examples of polymerized fiber materials include acrylate, polyimide, silicone, and carbon.

Figure 3:
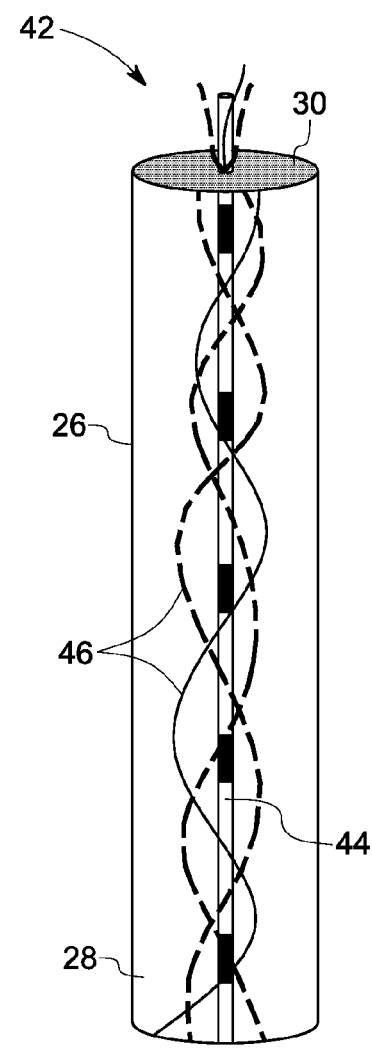
FIG. 3 is a schematic representation of a hermetically sealed sensing cable with woven fibers configuration for vertical deployment in another embodiment disclosed herein.

FIG. 3 illustrates a fiber sensing cable package 42 in another embodiment, including a thermally conductive enclosure 26 and a high-temperature fiber sensing cable 44, hermetically sealed (seal 30) within the enclosure space 28. Polymerized fibers 46 are disposed in a twisted configuration around the sensing fiber 44 to provide mechanical support and to maintain the fiber sensing cables inside the enclosure 26. The use of twisted fibers to support the fiber sensor cable enhances the cable's mechanical strength and improves the sensing system reliability.

Figure 4:
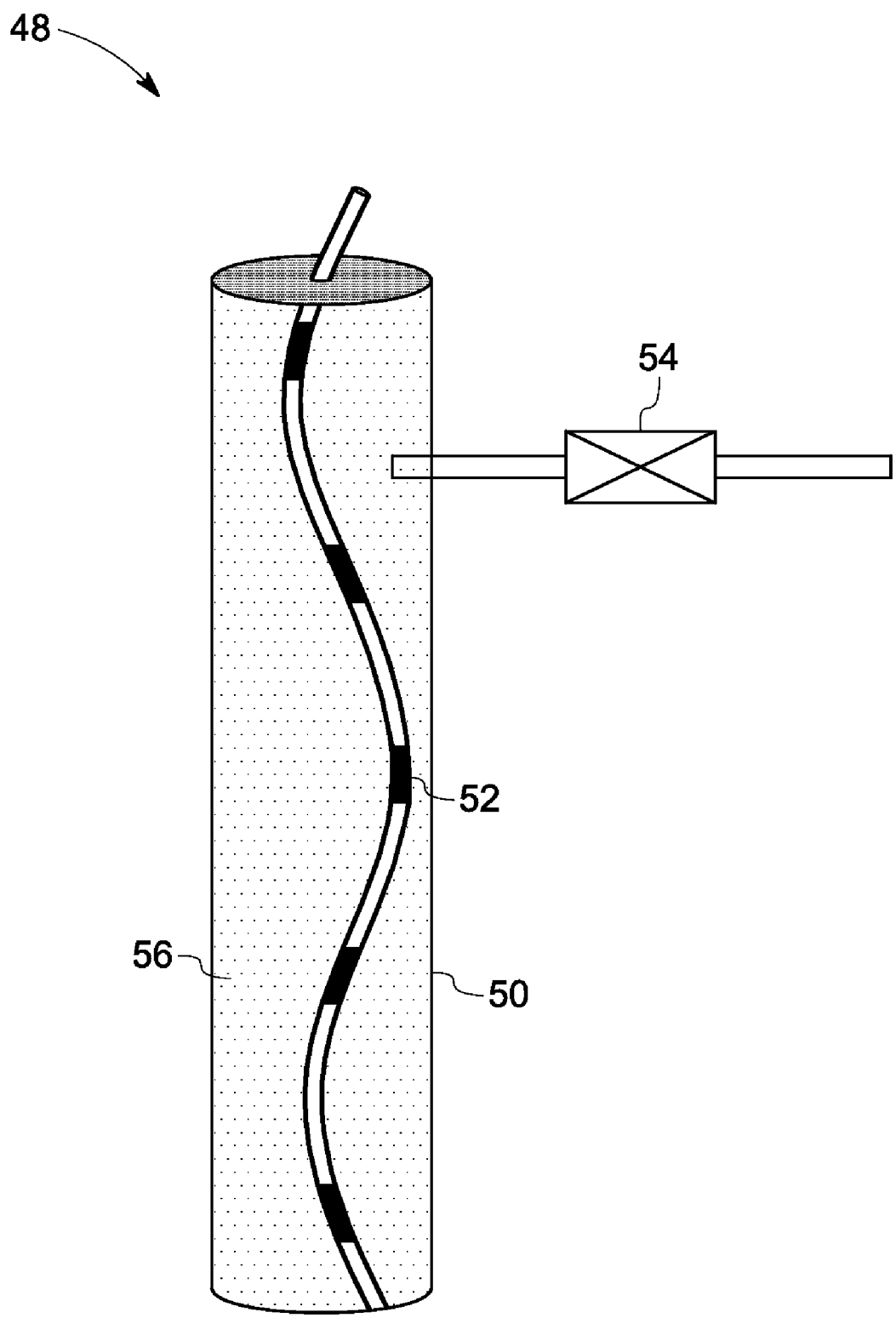
FIG. 4 is a schematic representation of a high pressurized, hermetically sealed sensing cable in another embodiment disclosed herein.

In one embodiment, the enclosure hermetically sealing the fiber sensing cable, includes a gas filling, for example nitrogen, to maintain the integrity of the fiber sensing cable when the environment is not only at a high temperature but also at a high pressure. FIG. 4 illustrates one such embodiment. The hermetically sealed sensor cable package 48 illustrated in FIG. 4 includes a thermally conductive enclosure 50 and a sensing cable 52. The enclosure is filled with a pressurized gas 56, through the valve 54 to maintain the sensor cable mechanical integrity at high pressures. Advantageously, hermetically sealed and pressure-maintained fiber sensing cables can prevent sensing cable collapse when environmental pressure is higher than the enclosure metal tensile strength. In one embodiment, the enclosure 50 is filled with nitrogen gas to balance dynamic environmental pressure variation. In a non-limiting example, the enclosure is filled with a dynamically balanced 100 psi to 500 psi (~0.68-3.45 MPa) nitrogen gas for both high-temperature and high-pressure environmental applications. In one example, the fiber sensing cable 52 is a metalized fiber HTFBG array such as discussed with respect to FIG. 1.

Figure 5:
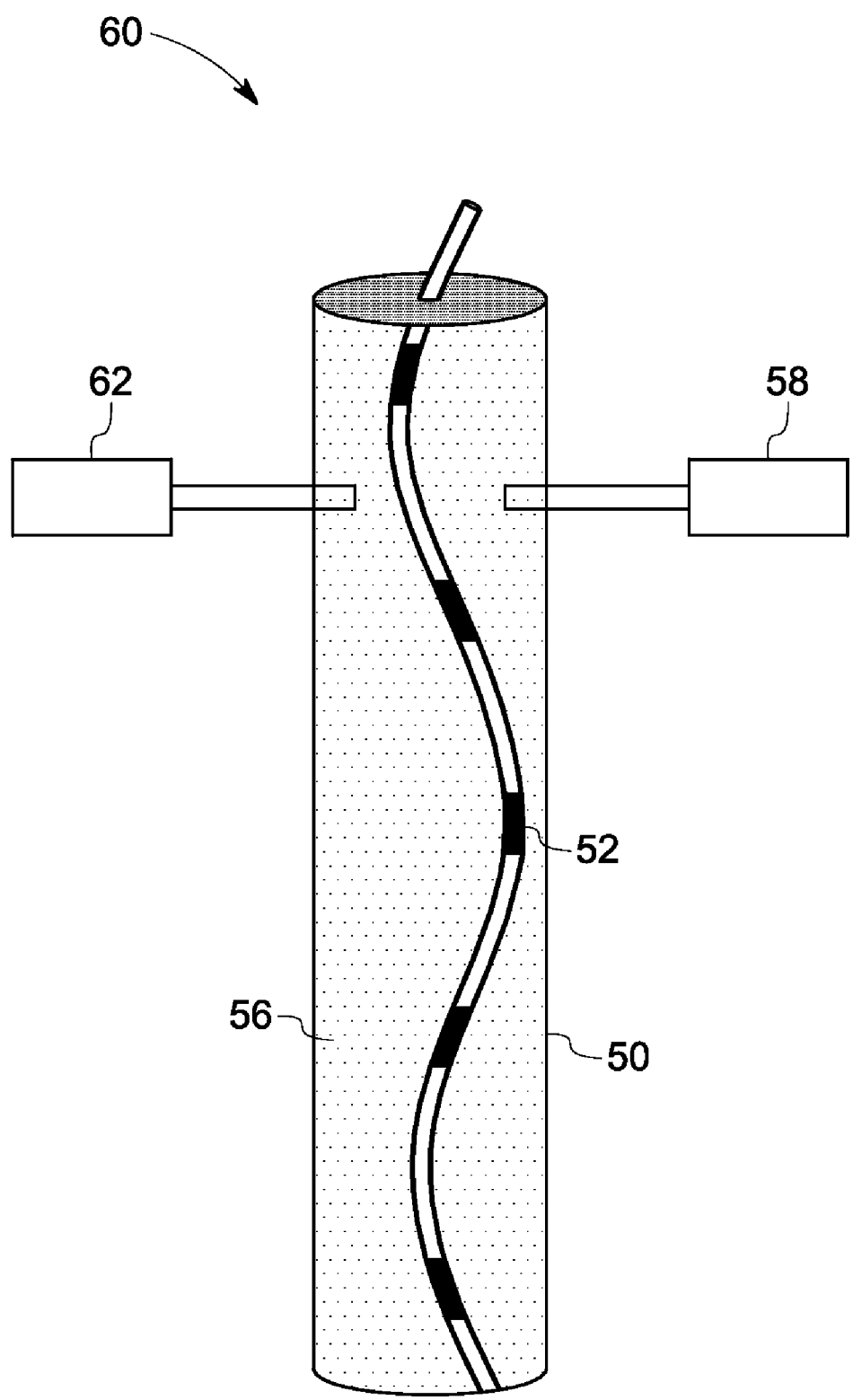
FIG. 5 is a schematic representation of a hermetically sealed sensing cable with combustible gas detection gauge and a pressure gauge in another embodiment disclosed herein.

In another embodiment, the enclosure hermetically sealing the fiber sensing cable is monitored with a combustible gas gauge and a pressure gauge when the environment is not only at a high temperature and pressure but also contains combustible gases. FIG. 5 illustrates one such embodiment. The hermetically sealed sensor cable package 58 illustrated in FIG. 5 includes a thermally conductive enclosure 50 and a sensing cable 52. The enclosure is connected with a combustible gas detector 58 and a pressure detection gauge 62 for monitoring sensing cable's integrity. In one example, the combustible gas detectors are mainly used for sensing 100-1000 ppm level of $H_2$, $CO$, $SO_2$, and $H_2S$ that is leaked into the fiber sensing cable from the harsh environment such as a coal gasifier or coal boiler when the fiber cable losses its mechanical strength.

Figure 6:
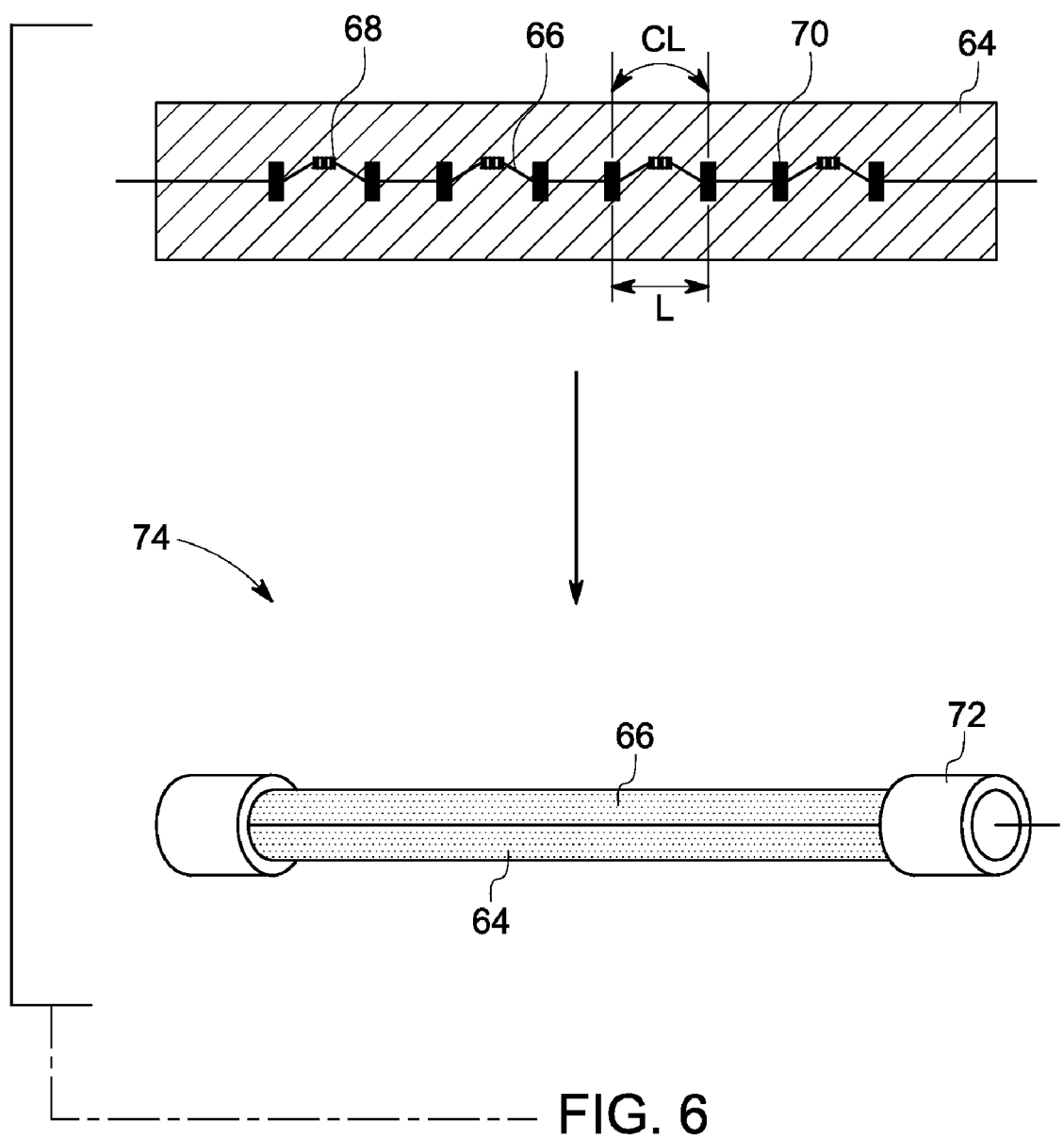
FIG. 6 is a diagrammatical representation of a hermetically sealed stress-free fiber sensing cable fabrication procedures in another embodiment disclosed herein.

FIG. 6 illustrates a method for hermetically sealing and packaging a fiber sensing cable in one embodiment, including disposing and fastening in non-linear sections a sensing fiber 66, including a plurality of the HTFBG sensors 68, on to a high-melting-point metal sheet material 64. In one example, this strain-free or stress-free package situates the HTFBGs in curved fiber sections and the fiber is welded (for metallized fiber) or clamped (for polymer coated fiber) at points 70 onto the high-melting-point metal sheet surface. The curved fiber length, CL, is greater than the straight length, L between two welding/clamping points. The length difference is chosen such that $\Delta L = CL - L$ is greater than or equal to $L \cdot \alpha \cdot \Delta T$, where $\alpha$ is the metal sheet material coefficient of thermal expansion, and $\Delta T$ is the temperature difference from the ambient to operation limit. After laser welding 70, the metal sheet is made into a cylindrical structure with two open ends. In the final step the ends are hermetically sealed with strain release tubing and high-temperature cement 72 to form a hermetically sealed fiber sensing cable package 74.

Figure 7:
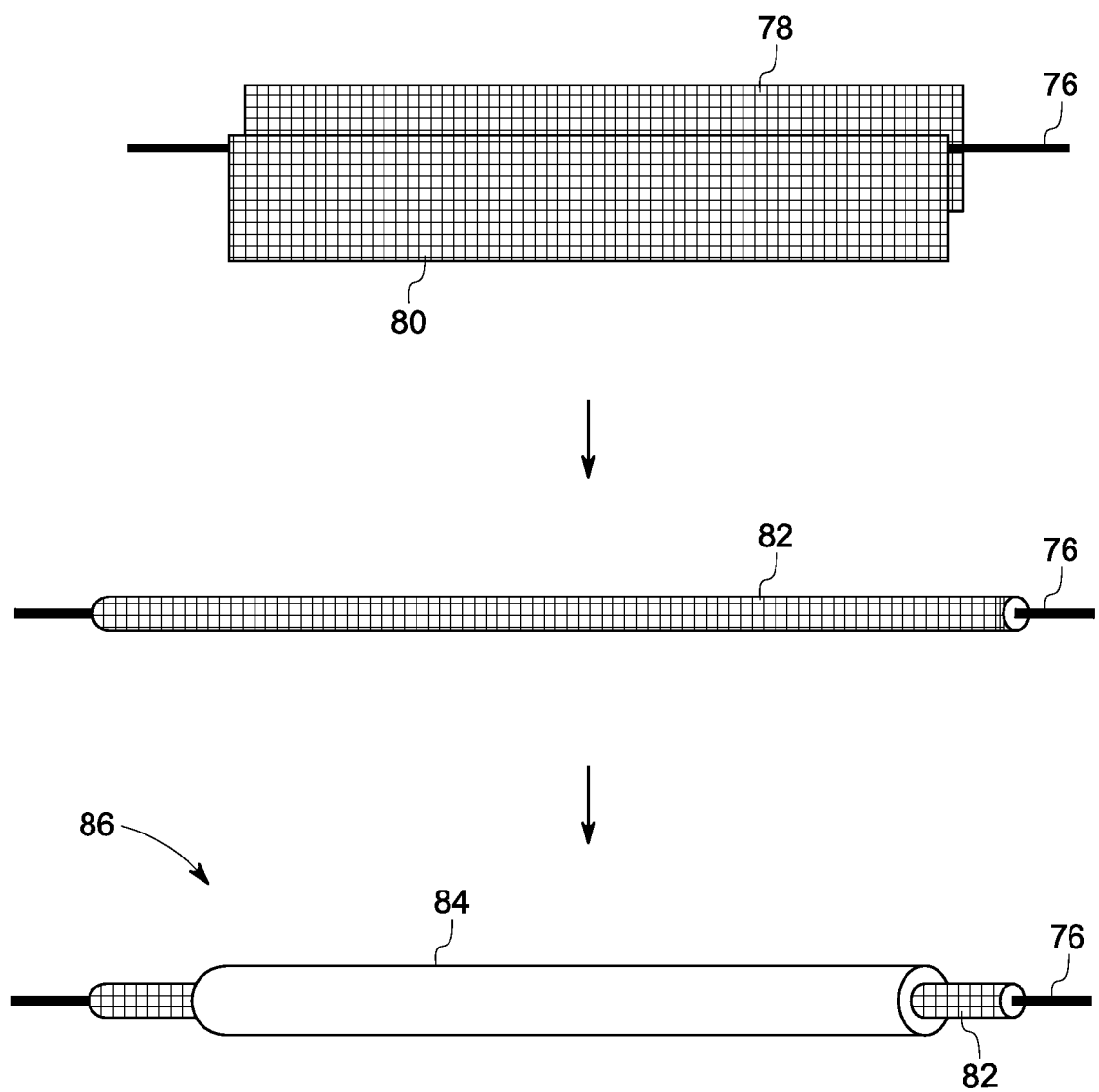
FIG. 7 is a diagrammatical representation of a hermetically sealed fiber sensing cable fabrication procedures in which the sensing fiber or fibers are firstly woven with ceramic fabrics, cloths or tapes and secondly are embedded into a laser welded metal sheet, in another embodiment disclosed herein.

In one embodiment, the sensing fibers may be wrapped or woven with ceramic fabrics, tapes, or sleeves for enhancing the fiber's mechanical strength. FIG. 7 illustrates such a fiber sensing cable packaging method in another embodiment of the present invention. The packaging method includes disposing a sensing fiber cable 76 with a plurality of HTFBG sensors between two high-temperature ceramic fabrics 78 and 80 and wrapping the fabrics around the fiber cable 76. The ceramic fabric wrapped sensing fiber cable 82 is embedded into a high-melting-point metal sheet metal sheet, which is then rolled into a cylinder and laser welded to form a cylinder 84 with two open ends. In the final step, the open ends are hermetically sealed with strain release tubing and high-temperature cement (not shown) to form a hermetically sealed fiber sensing cable package 86.

Figure 8:
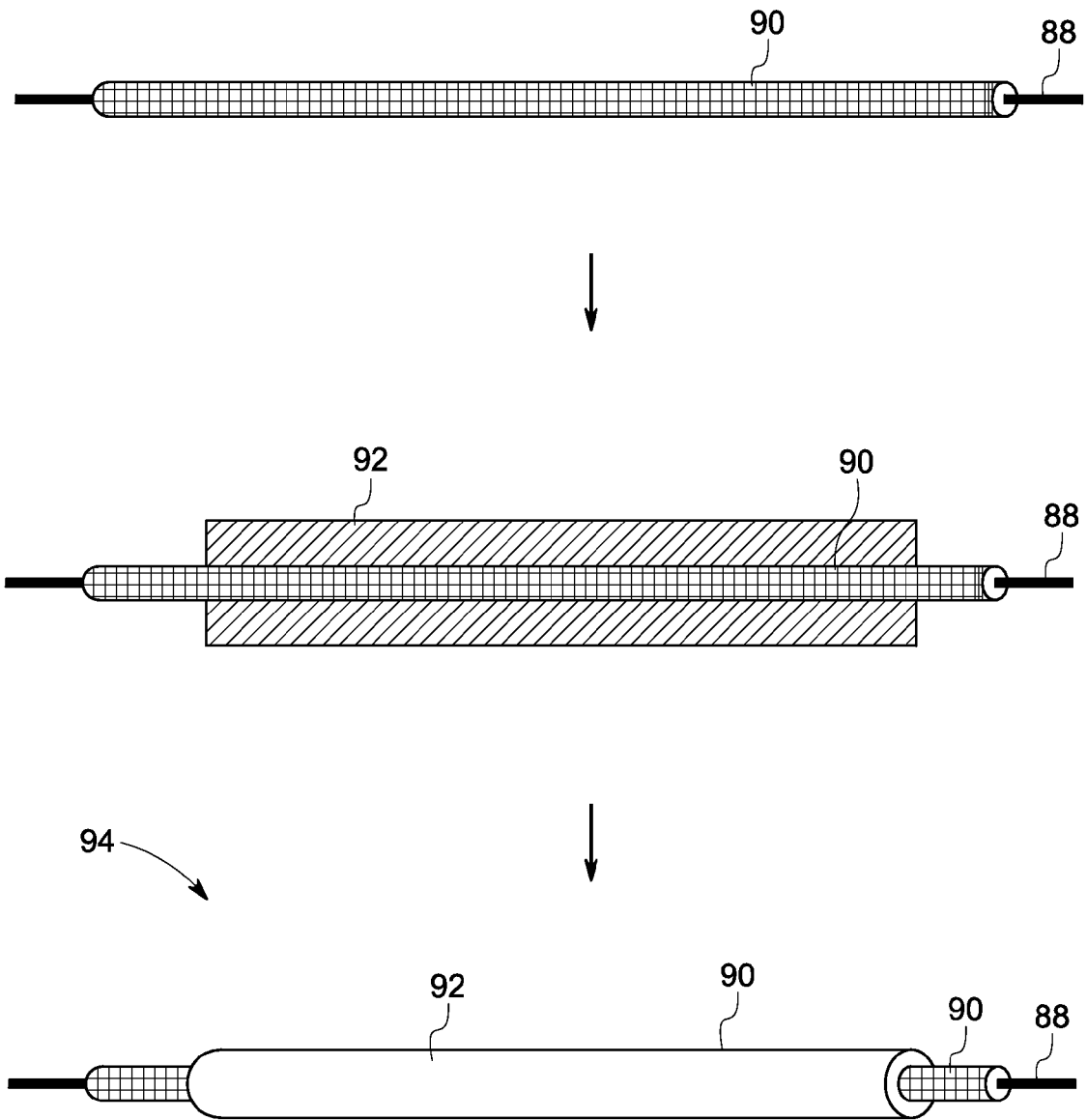
FIG. 8 is a diagrammatical representation of a hermetically sealed fiber sensing cable packaging in which the sensing fiber or fibers are woven with either ceramic sleeves and embedded in a laser welded metal sheet, in another embodiment disclosed herein.

FIG. 8 illustrates a fiber sensing cable packaging method in another embodiment, including disposing a sensing fiber cable 88 within a high-temperature ceramic sleeve 90 and then embedding the fiber cable with the sleeve on to a high-melting-point metal sheet material 92. The ceramic fiberglass sleeve protects the sensing fibers. The metal sheet is laser welded to form a cylinder with two open ends which are subsequently sealed with strain release tubing and high temperature cement (not shown) to form a hermetically sealed fiber sensing cable 94.

The ceramic woven materials are high strength, flexible, durable, dimensionally and chemically stable and offer excellent electrical resistance. They are typically woven from industrial grade, asbestos free, high alumina ceramic fibers or silica fibers. These materials are non-hygroscopic, non-porous, abrasion resistant and dimensionally stable, and resistant to molten metal sparks and splashes, most chemicals and solvents. Table 2 tabulates fundamental material properties as interior packaging material for fiber sensing cables. In one example, Their thermal conductivity is about 0.93 BTU·in/Hr·° F.·ft² at 1000° F. (537° C.).

TABLE 2

Woven Ceramic fiber materials (fabrics, tapes, sleevings, and cloths) for embedding sensing fibers.

| Material properties | Alumina-oxide Material | Silica Material | Low-silica Material | High-silica Material |
|---|---|---|---|---|
| Continuous operation Temperature (° F. or (−32) × 0.5555° C.) | 2600 | 2000 | 1100 | 1500 |
| Melting point (° F.) | 3300 | 3100 | 2800 | 2800 |
| Thermal conductivity (BTU in/Hr ° F. ft²) or (×0.1442 Wm⁻¹K⁻¹) | | | | |
| at 500° F. or ~260° C. | 0.45 | 0.45 | 0.48 | 0.50 |
| at 1000° F. or ~537° C.) | 0.90 | 0.93 | 0.90 | 0.95 |
| at 2000° F. or ~1093° C.) | 1.60 | 1.50 | 1.40 | 1.65 |
| Alumina & refractory oxides | 98% | 98% $SiO_2$ | 90% Silica | 95% Silica |
| Tensile strength (PSI or ×0.0068947 MPa) | 250,000 | $5 \times 10^5$ | $5 \times 10^6$ | $5 \times 10^7$ |
| Elastic modulus (PSI or ×0.0068947 MPa) | $22 \times 10^6$ | $10.5 \times 10^6$ | $8 \times 10^6$ | $8.5 \times 10^6$ |
| Porosity (%) | 0 | 1 | 0 | 0.5 |

Figure 9:
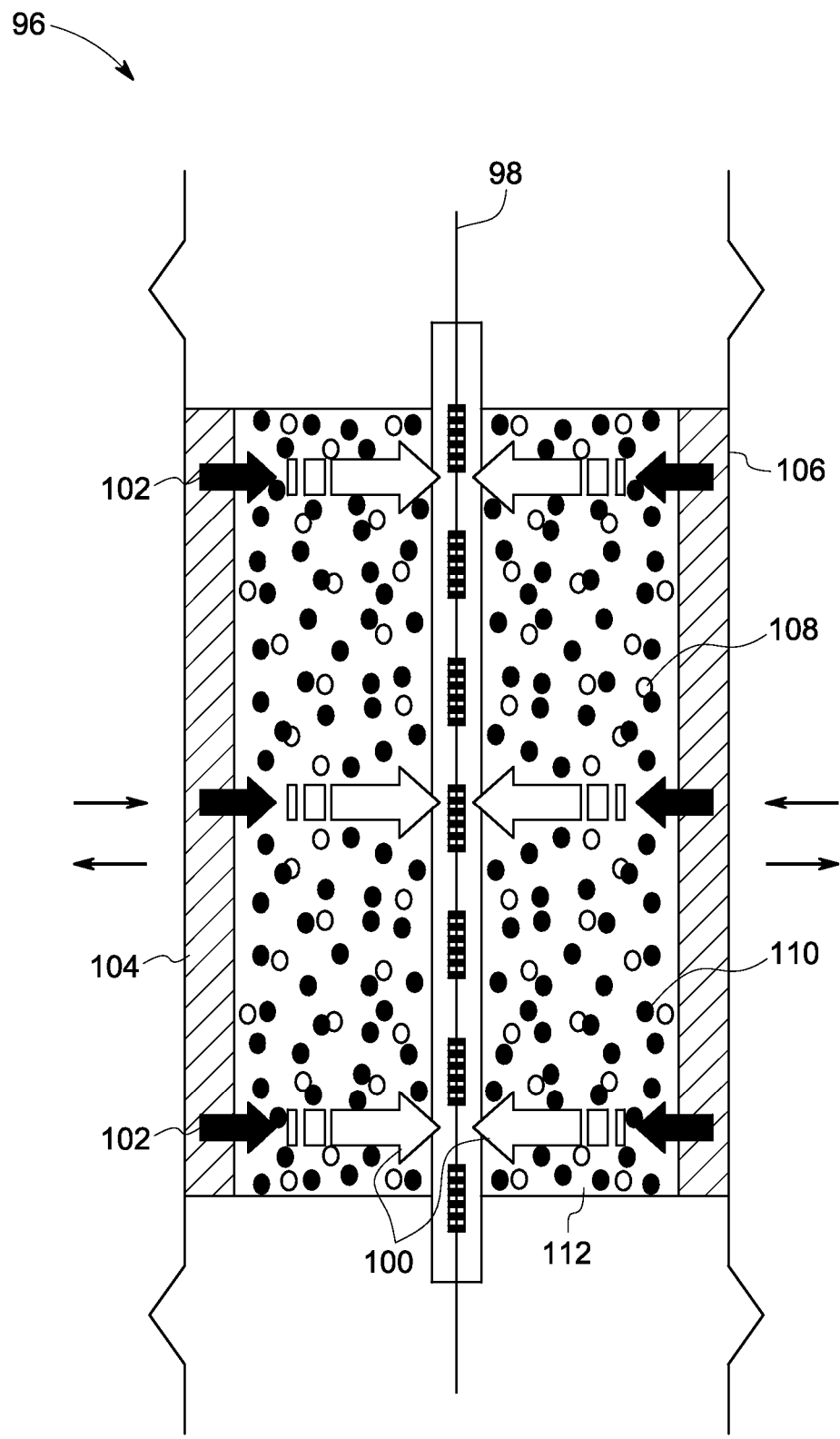
FIG. 9 is a schematic representation of a hermetically sealed sensing cable filled with wide-band-gap micro-particle materials for preventing fiber sensing cable internal thermal convection and thermal radiation in another embodiment disclosed herein.

In another embodiment, hermetically packaged fiber sensors provide an integrated and robust solution for sensing in harsh environmental conditions by substantially matching thermal conductivity and thermal expansion coefficients among sensor materials, insulation filler materials, and package materials. FIG. 9 illustrates fiber sensing cable package 96 in one embodiment, including sensing fiber 98 hermetically sealed within enclosure 106. The illustrated embodiment further includes a mixed particle material 108 and 110 filling the enclosure 106 to enable fast heat exchange from exterior to interior of the enclosure 106 by thermal conduction. The external thermal sources could be a combination of the thermal radiation and convection from hot gas or flaming. The high-reflective metal sheet material at least the outer surface 104 of the enclosure could effectively reflect short-wavelength of electromagnetic waves ($\lambda < 2$ μm). In one embodiment, the absorbed radiation and convection energy by the metal tube will re-radiate from metal sheet external surface back to environment, but the internal surface 102 will reemit partial radiation energy toward sensing fiber or fibers. In a non-limiting example, the mixed particle material includes micro-particles having a dimension in the micrometer range. The micro-particle filler materials may be a mixture of micrometer-sized metal (Ag, Al, Ni, Cu, Ta, Co, Fe, Mg, stainless steel, Inconel etc.) particles 108 and wide-band-gap micrometer sized particles 110 (Silica, Alumina, Magnesia, Hafnia, TiO2, SiC, SiN etc). The metal micro-particles 108 are used to reflect short-wavelength electromagnetic waves (λ<2 μm), and wide-band-gap micro-particles 110 are used to absorb long wavelength (λ>2 μm) thermal radiation. The voids among particles 108 are also used to attenuate reflected short-wavelength electromagnetic waves (λ<2 μm). This enables high responsivity to environmental temperature variation and also mitigates the thermal radiation induced temperature increase at sensing fiber location 100. Table 3 presents some advantageous thermal properties of wide-band-gap materials used in some embodiments of the present invention. The example filler materials of Table 3, exhibit high maximum operation temperature, for example greater than 2500 degree Fahrenheit (~1317 degree Centigrade), and high SAG temperature, for example, greater than 2500 degree Fahrenheit (~1317 degree Centigrade). Here the SiC, SiN and $TiO_2$ micro-particle materials are also good as fiber sensing cable interior package materials for T≦1500° F. (~815 degree Centigrade), application.

TABLE 3

Wide-band-gap micro-particle material thermal properties.

| Insulation Materials | Maximum operation temp (MOT) ° F. or (MOP ° F. − 32) × 0.5555° C. | SAG temperature (SAGT) ° F. or (SAGT ° F. − 32) × 0.5555° C. |
|---|---|---|
| Alumina($Al_2O_3$) | 3100 | 2900 |
| Procelain | 2550 | 2550 |
| Quartz ($SiO_2$) | 2700 | 2500 |
| Hafnia ($HfO_2$) | 4530 | 3500 |
| Magnesia (MgO) | 3000 | 3550 |

Figure 10:
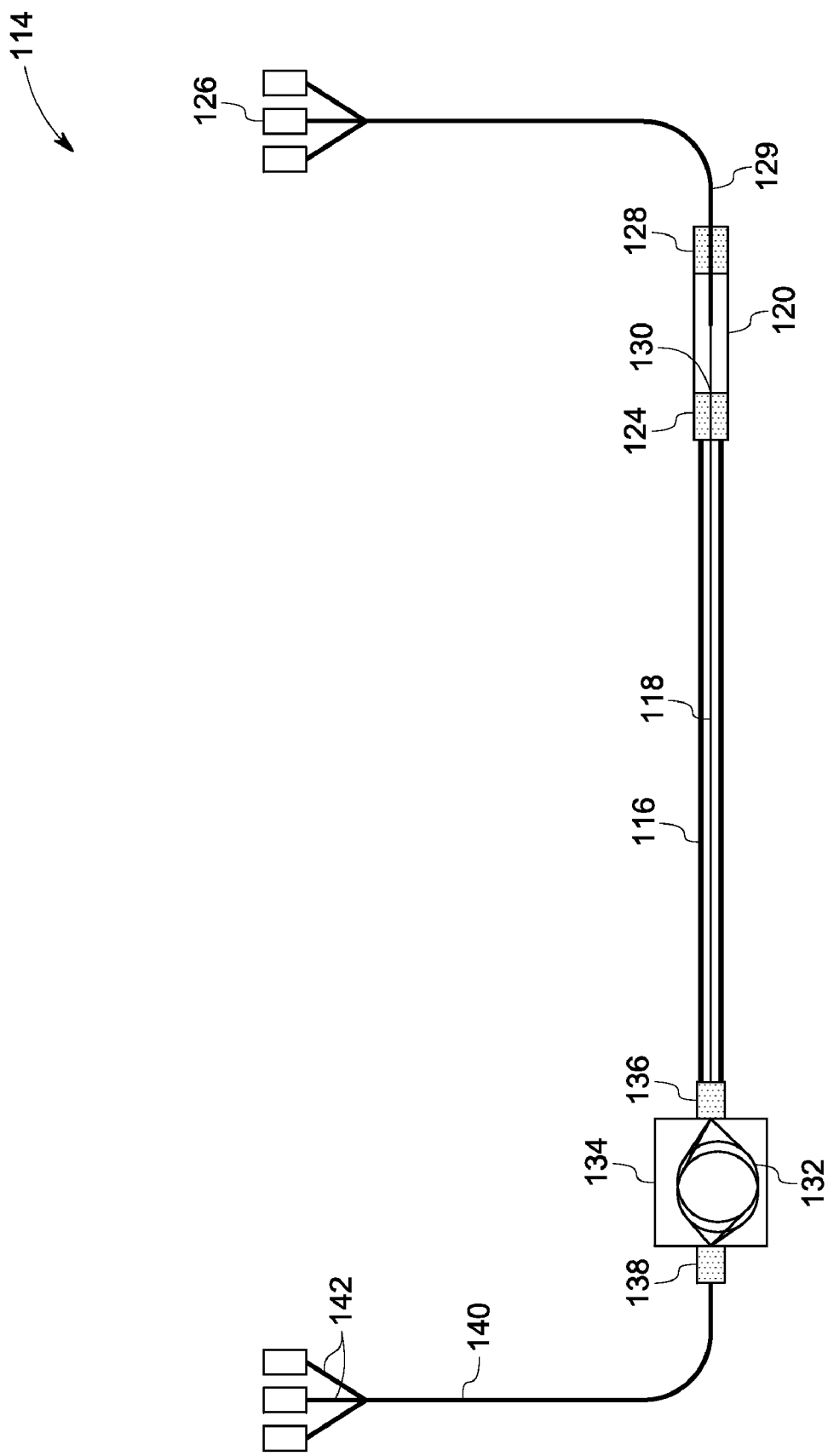
FIG. 10 is a field deployed high-temperature temperature sensing cable in another embodiment disclosed herein.

FIG. 10 illustrates, in one embodiment, a temperature sensing cable system 114 including a hermetically sealed fiber sensing cable 118 with a double walled metal enclosure 116. In one example, a double walled metal enclosure is formed by using two metal sheets folded together and then welded to form a two cylinder tubing structure. In a non-limiting example, the metal enclosure is made of Incoloy 800 or Inconel 600. On one end of the fiber sensing cable 118 is a seal with a metal tube 120. The sensing cable 122 is connected to a FC/APC (fixed connector/Amphenol precision connector) connector 126 at the other end to enable coupling the cable to an interrogator. The metal tube 120 is sealed to the fiber sensing cable package using a metal to metal seal 124. At the other end of the metal tubing, a strain relief transition tube 128 is provided. A PTFE tubing (polytetraflourinatedethylene) 130 is provided to prevent the fiber breaking at the edge of the tube 120. At the other end of the cable 118, the cable is connected to a steel enclosure 134 including some cable slack 132 for reducing mechanical strain when the metal tubing is thermal expanded at the high-temperature operation which is much larger than the fiber material. The Incoloy, Inconel or Stainless steel-based metal enclosure is hermetically sealed to the fiber cable on one end 136 and the output cable 140 at the other end 138. The output cable 140 is connected to an FC/APC connector 142 for connection to a junction box (not shown).

A harsh environmental steady and dynamic temperature profile measurement can be conducted based on a distributed and hermetical sealed fiber sensing cable and sensing system. The fiber sensing cable comprises one or multiple sensing fibers with a plurality of high-temperature fiber Bragg grating sensors (HTFBG) that are embedded into high-melting-point metal material. The dynamic thermal sensing reliabilities of such HTFBG sensor-embedded sensing cables is expected to be dependent on effective thermal radiation and convection prevention, hot spot thermal isolation, and mechanical protection. Embodiments of the present invention include hermetically packaged fiber sensing cable systems and methods for such harsh environmental steady and transient temperature profile measurement.

Figure 11:
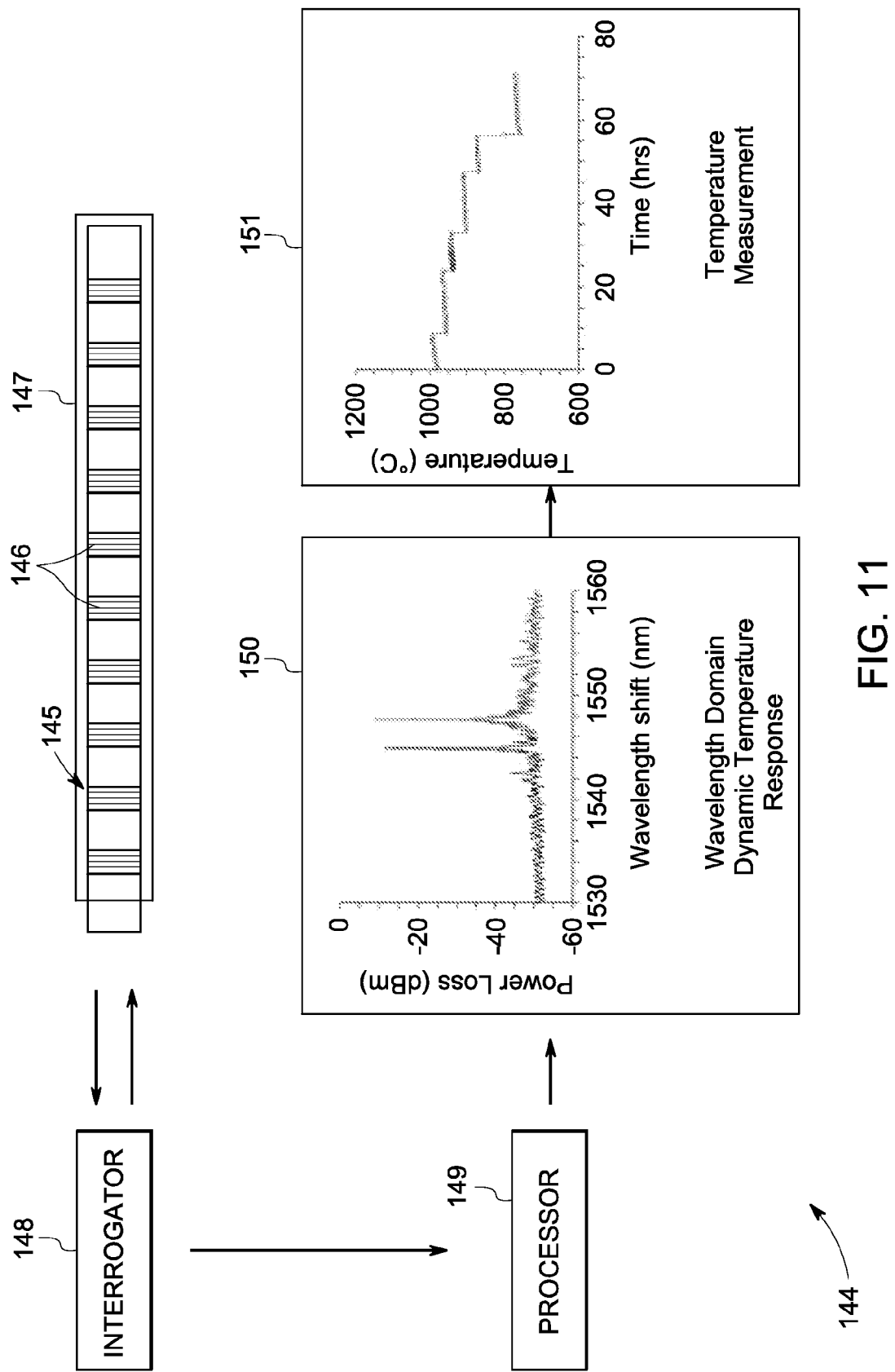
FIG. 11 is a schematic representation of a fiber sensing system for harsh environmental steady and dynamic temperature profile mapping in one embodiment disclosed herein.

FIG. 11 illustrates a fiber HTFBG-based temperature measurement system 114 in one embodiment, including a fiber sensing cable 145. The fiber sensing cable includes a plurality of the HTFBG sensors 146 and is encased in a hermetically sealed package 147. An interrogator 147 including a broadband tunable laser 148 (outputting for example at a wavelength range from 1.5 μm to 1.6 μm) is used to send an interrogating signal to the sensing cable and receive a response signal generated by the fiber HTFBG sensors 146, corresponding to a sensed temperature by each of the HTFBG sensor and measured as a relative wavelength shift. The response signal is further processed by a processor (data acquisition and analysis system 149) to generate a wavelength domain steady or dynamic temperature response 150, which in turn is sued to generate temperature measurements 151. In one example, the temperature measurements are obtained from the following set of equations:

$$\Delta T(t)=\Delta\lambda(pm)/6.4(pm/° F.) \text{ for } T<800° F., \text{ and}$$

$$\Delta T(t)=\Delta\lambda(pm)/8.3(pm/° F.) \text{ for } 800° F.<T<2200° F.,$$

where the 6.4 pm/° F. is the measured temperature sensitivity of the HTFBG valid for environmental temperature is between ambient to about 800° F. When the environmental temperature is greater than 800° F., the HTFBG sensor has a temperature sensitivity of 8.3 pm/° F. Beyond that, fiber HTFBG sensor requires nonlinear calibration for temperature sensing.

The sensing system may be configured for measurement in either reflection mode or transmission mode. In some embodiments, the sensing fibers may be metalized ones. In some other embodiments, the sensing fibers may be coated with a polymeric material. The sensing fibers may be single mode or multimode fibers. Embodiments of the present invention include the fibers in simplex or multiplex configurations.

In a non-limiting example, the fiber sensing cable may seal several hundred fiber sensors in one or more fibers within a length of a few meters to a few kilometers in distance. In one embodiment, the fiber sensors in the cable could be used for steady thermal profile mapping, dynamic thermal profile mapping, and transient thermal ramping. The hermetically sealed fiber sensing cables also can be of multi-function capability. One example of the multi-function may be based on its thermal and mechanical strain response characteristics. The mechanical strain sensitivity can be used for steady and dynamic pressure detection, structural stress and strain measurements, and structural vibration sensing. In one embodiment, the hermetically sealed fiber cables are not limited to high-temperature and high-pressure environment measurements, they can also be used in high-electromagnetic interference noise, high-radioactive nuclear environments.

Figure 12:
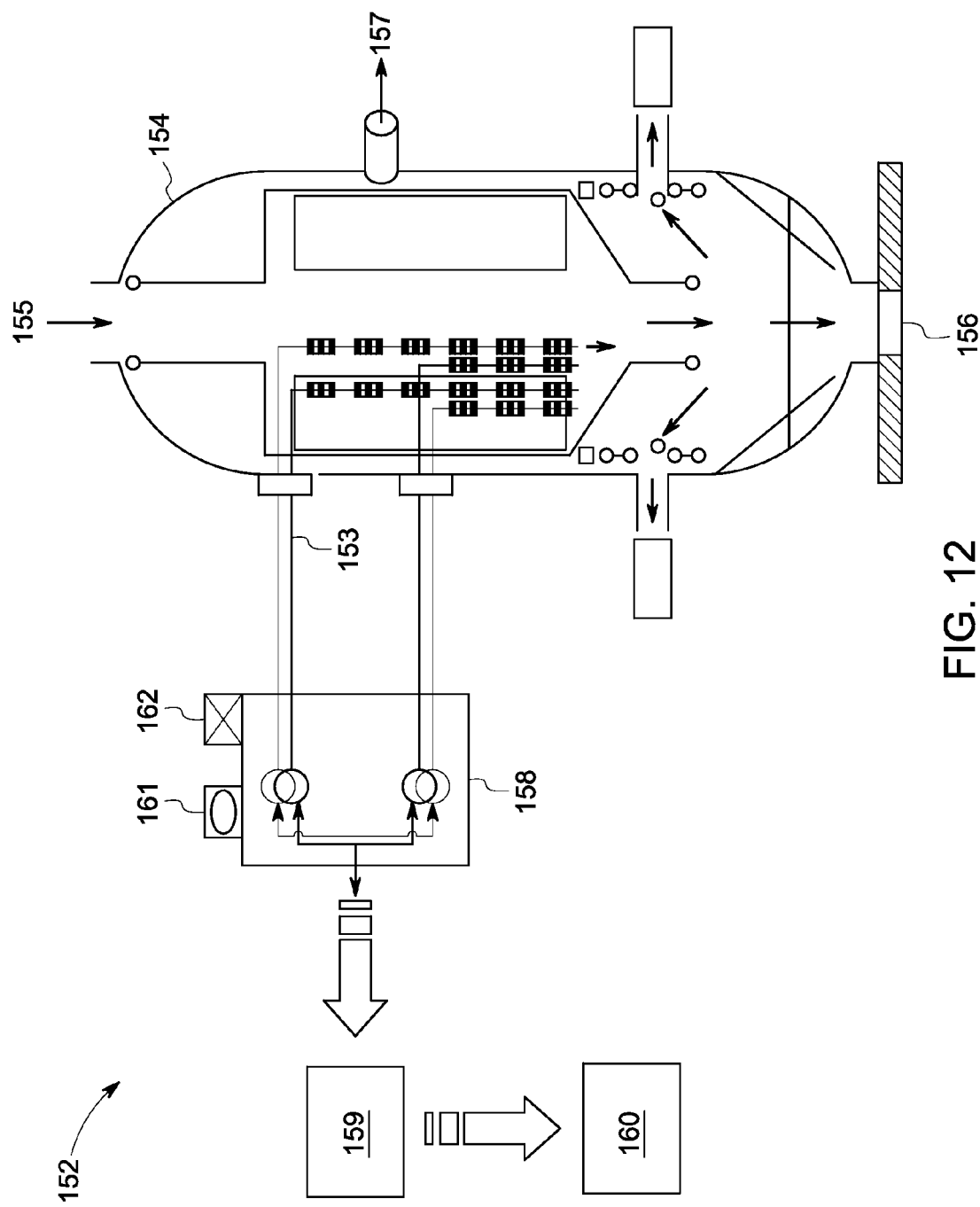
FIG. 12 is a schematic illustration of a fiber temperature sensing system deployed in a coal gasification radiant syngas cooler (RSC) vessel in another embodiment disclosed herein.

Another embodiment is a gasifier 152 including a harsh environment sensing cable package. A gasifier is an apparatus for converting carbonaceous materials, such as coal, petroleum, petroleum coke or biomass, into carbon monoxide, hydrogen, and carbon dioxide. The gasification process typically includes three processes: pyrolysis, combustion, and gasification. A fiber sensing system 153 can be deployed in a gasifier unit of the coal gasification environment such as a radiant syngas cooler vessel 154 as shown in FIG. 12. The coal slurry is dropped from gasifier outlet 155, and the produced syngas is delivered to external gas turbine by pipeline 157. The slag is removed from bottom entry 156. Some of the fiber sensing cables in the sensing system 146 are installed along the platen edge while others are hung in the gas stream. The fiber sensing cables are terminated by a junction box 158 that is located outside the fiber cable penetration position near the RSC. The sensing signal interrogation system 159 can be remotely located at a control room. The data is processed and analyzed with a sensing computer 160. The fiber sensing cables' self health condition is monitored by a pressure detection gauge 161 and a combustible gas detection gauge 162.

Upon start of gasification, the temperature ramps up and reaches a gasification temperature range of 2300° F. (~1260° C.) to 2700° F. (1426° C.) at the location of the top RSC entry location. The temperature is higher towards the top of the gasifier and gradually decreases towards the bottom. In one embodiment, the cable has vertically distributed sensors. In one embodiment, the sensors have the same response wavelength at a given temperature. In an alternate embodiment, the sensors are configured to have varied response wavelengths induced by dynamic coal gasification processes.

EXAMPLE

In one example, hermetic-sealed fiber sensing cables were field installed in a radiant syngas cooler (RSC) vessel, as illustrated in FIG. 12, with temperatures rising up to 2200° F. (1204° C.) and pressures up to 600 psi at the sensing cable penetration point, which is 6 meters away from the RSC coal slurry entry. A feasibility demonstration was performed of the measured dynamic temperature variation from a hermetically sealed fiber sensing cable of 30 meters vertical length inside the RSC at different times following the gasification startup. The fiber sensing cable had ten HTFBG sensors distributed through the sensing fiber. Immediately after the gasification start up, the temperature was ramped from 500° F. (260° C.) to 2000° F. (1093° C.) within three minutes, which was also detected by the ten fiber sensors.

Figure 13:
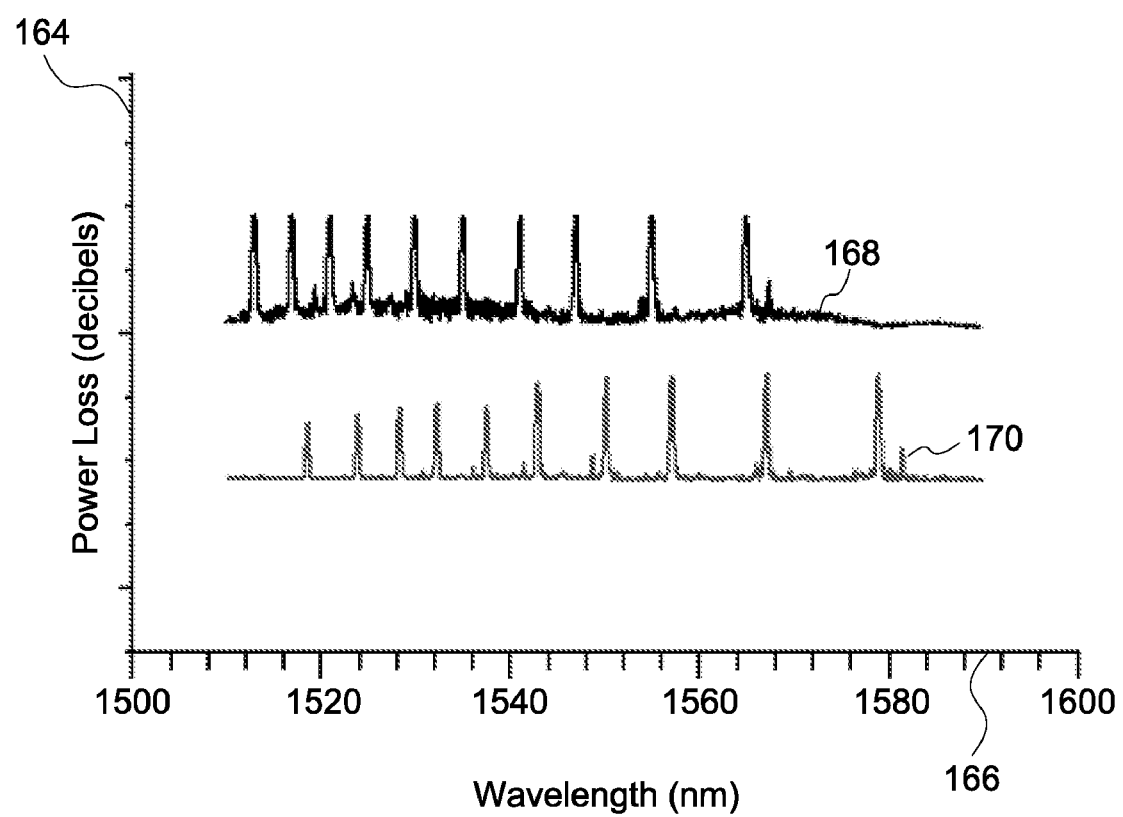
FIG. 13 is a graphical illustration of a measured response signal from a sensor cable including ten FBG sensors disposed to measure temperature in a coal gasification radiant syngas cooler (RSC) vessel in one embodiment disclosed herein.

FIG. 13 illustrates the reflection spectrum from sensors during steady state and dynamic temperature measurements. The Y-axis 164 represents the power loss measured in decibels and the X-axis 166 represents the wavelength shift in nanometers. The line plots 168 and 170 illustrate the reflection spectra corresponding to the response wavelengths for a steady RSC temperature variation from propane gas heating process and dynamic coal gasification process 170. Comparing 168 and 170, linear shifting of the response wavelengths due to the thermal effects is evident.

Figure 14:
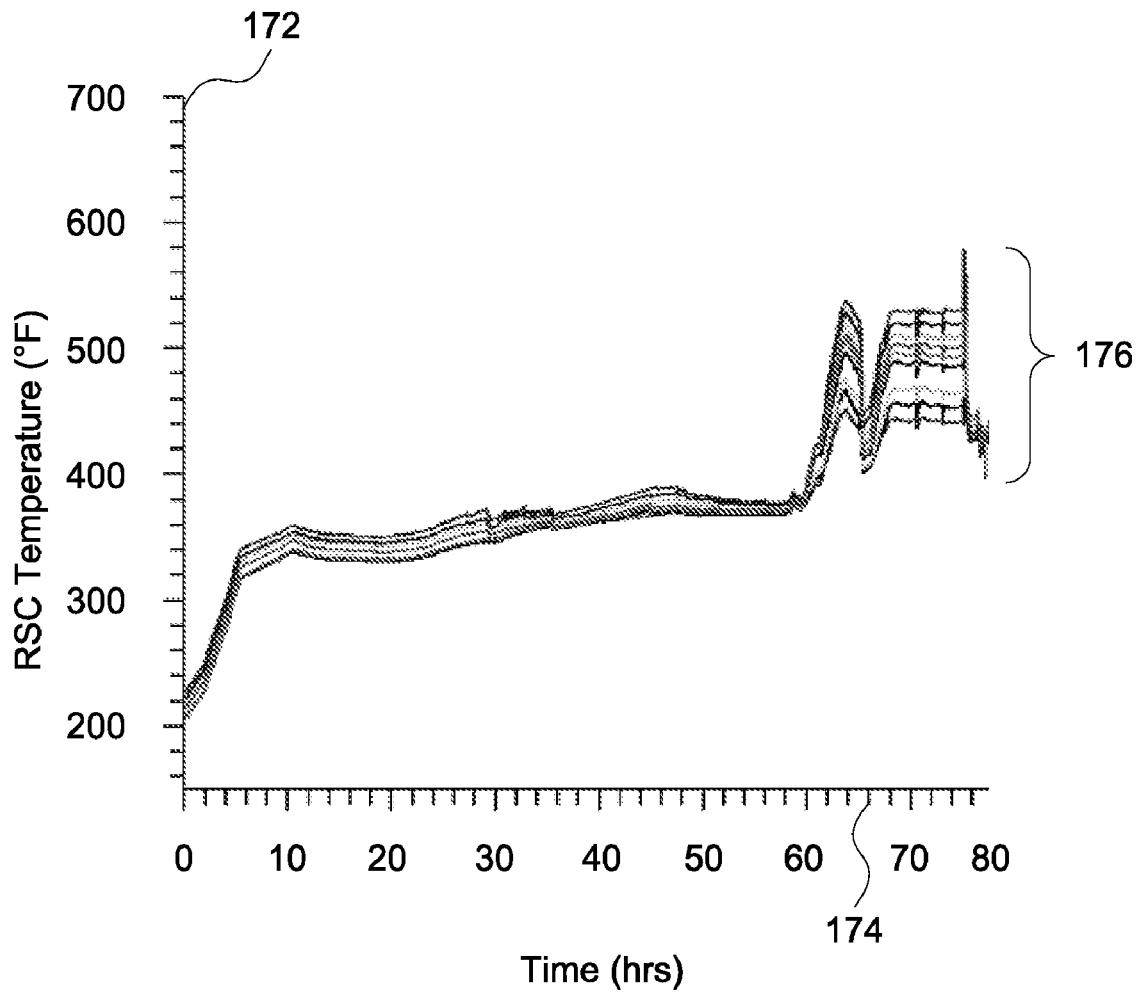
FIG. 14 is a graphical illustration of measured dynamic temperature from a sensor cable including ten FBG sensors in a RSC vessel in one embodiment disclosed herein.

FIG. 14 plots the steady state temperature profile from the RSC propane heating process during a period of 80 hours. The Y-axis 172 represents the RSC temperature measured in Fahrenheit and the X-axis 166 represents the time during the propane heating process. The ten HTFBG sensors are separated 1.5 meters apart vertically from 7 meters far from top entry position. The line plots 176 represent the variation in the measured temperature during the propane heating process for each of the vertically separated sensors.

Figure 15:
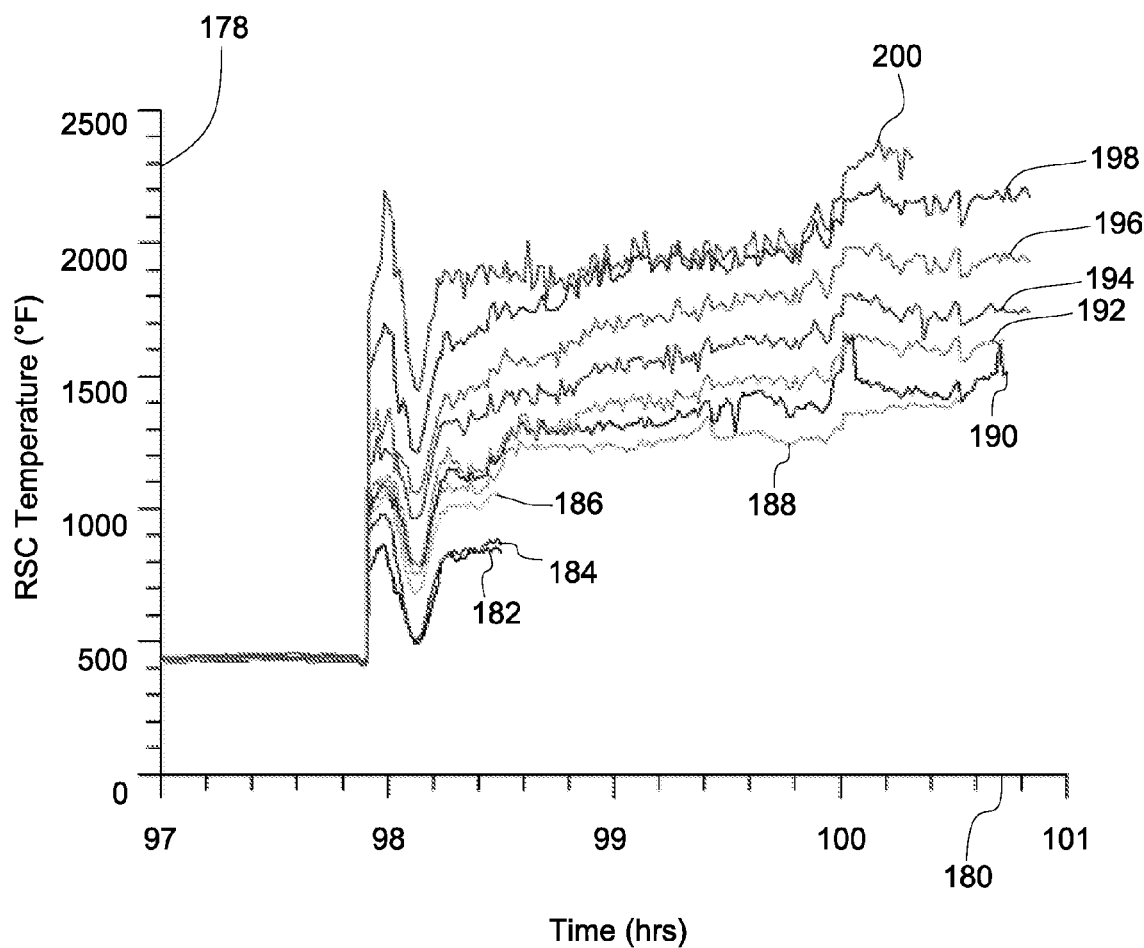
FIG. 15 is a graphical illustration of measured dynamic temperature from a sensor cable including ten FBG sensors in a RSC vessel in one embodiment disclosed herein.

FIG. 15 illustrates the variation in temperature with time for a time period including from before the start of gasification, the ramping of temperature from 500° F. (260° C.) to 2000° F. (1093° C.) after start of gasification and for fours hours following it. The X-axis 178 represents the RSC temperature measured at various points by the distributed sensors and the Y-axis represents time 180. Line plots 182, 184, 186, 188, 190, 192, 194, 196, 198, and 200 represent the temperature measured by the 10 distributed fiber sensors HTFBG 1, HTFBG 2, HTFBG 3, HTFBG 4, HTFBG 5, HTFBG 6, HTFBG 7, HTFBG 8, HTFBG 9, and HTFBG 10 respectively, where HTFBG 1 is disposed 22 meters below the RSC top, and hence measures the lowest steady state or dynamic temperature profile, whereas FBG 10 is disposed 7 meters below the top part of the RSC, and measures the highest temperature. FIG. 15 clearly illustrates that the embodiments of the sensor cable packages disclosed herein are robust at temperatures of even 2000° F.(1093° C.).

Figure 16:
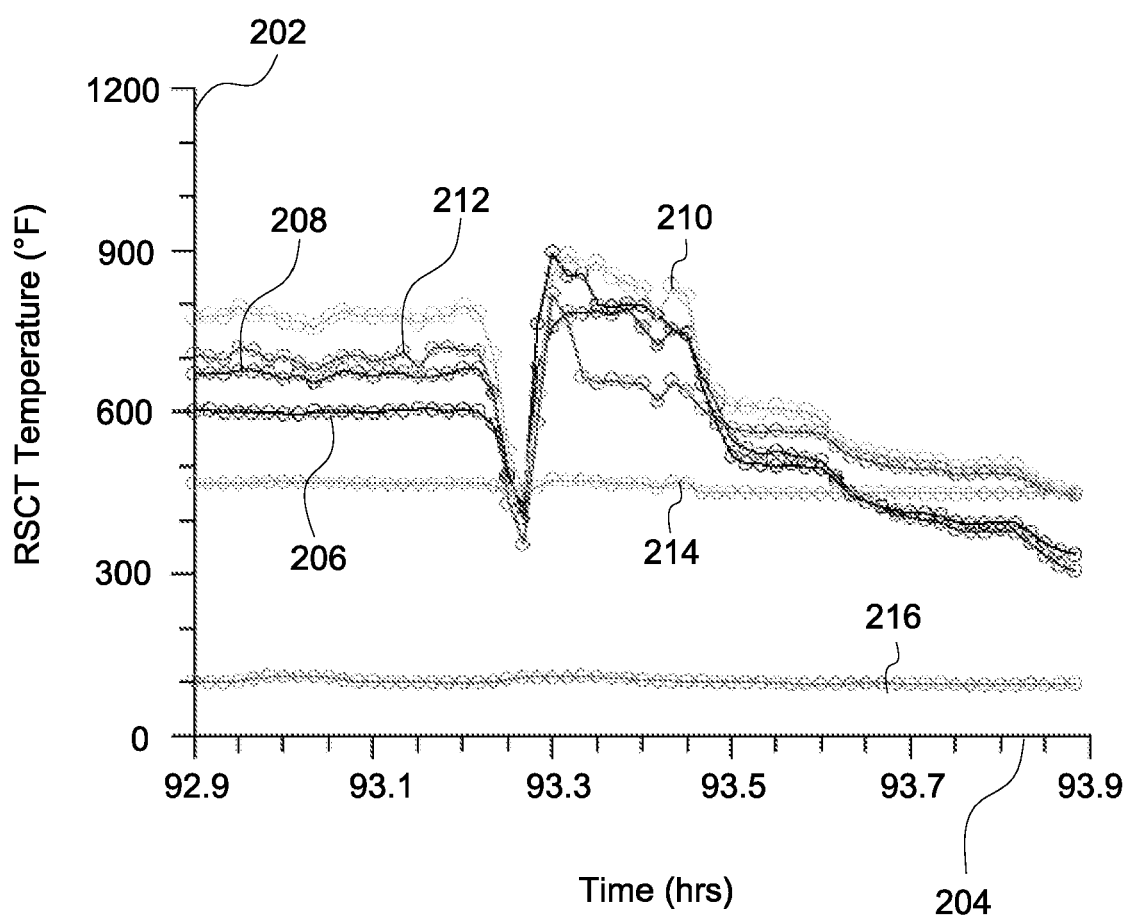
FIG. 16 represents a graphical illustration of measurements from fiber sensors, in another embodiment disclosed herein.
Figure 17:
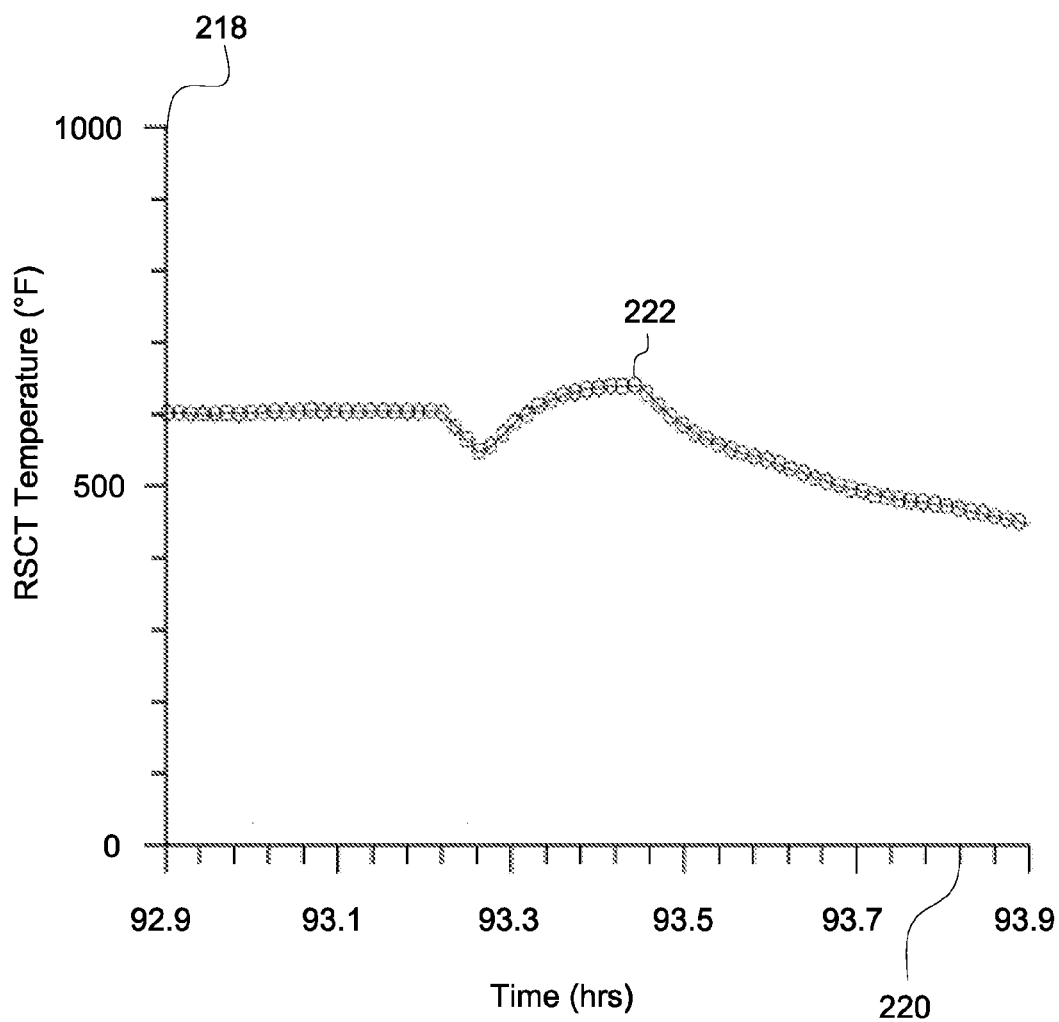
FIG. 17 represents a graphical illustration of measurements from thermocouple sensors, in another embodiment disclosed herein.

FIGS. 16 and 17 further illustrate the RSC temperature profile measured during the propane heating process using a fiber sensing cable package and using a thermocouple respectively. The X-axis 202 in FIG. 16 represents the RSC temperature measured at various points by the distributed sensors and the Y-axis 204 represents time in FIG. 16. Line plots 206 to 216 illustrate the measured variation in temperature during the propane heating process as measured by FBGs 14 through 19. In plot 17, the X-axis 218 represents the RSC temperature measured by a thermocouple and the Y-axis represents time 220 during the propane heating process. The line plot 222 illustrates the temperature variation with time as measured by the thermocouple. Due to the heavy shielding around the thermocouple, its temperature profile suffers from the shielding material screening effect. However, the fiber sensor measurement shown in FIG. 16 demonstrates the sensor cable package has desirable response characteristics to temperature variations.

Figure 18:
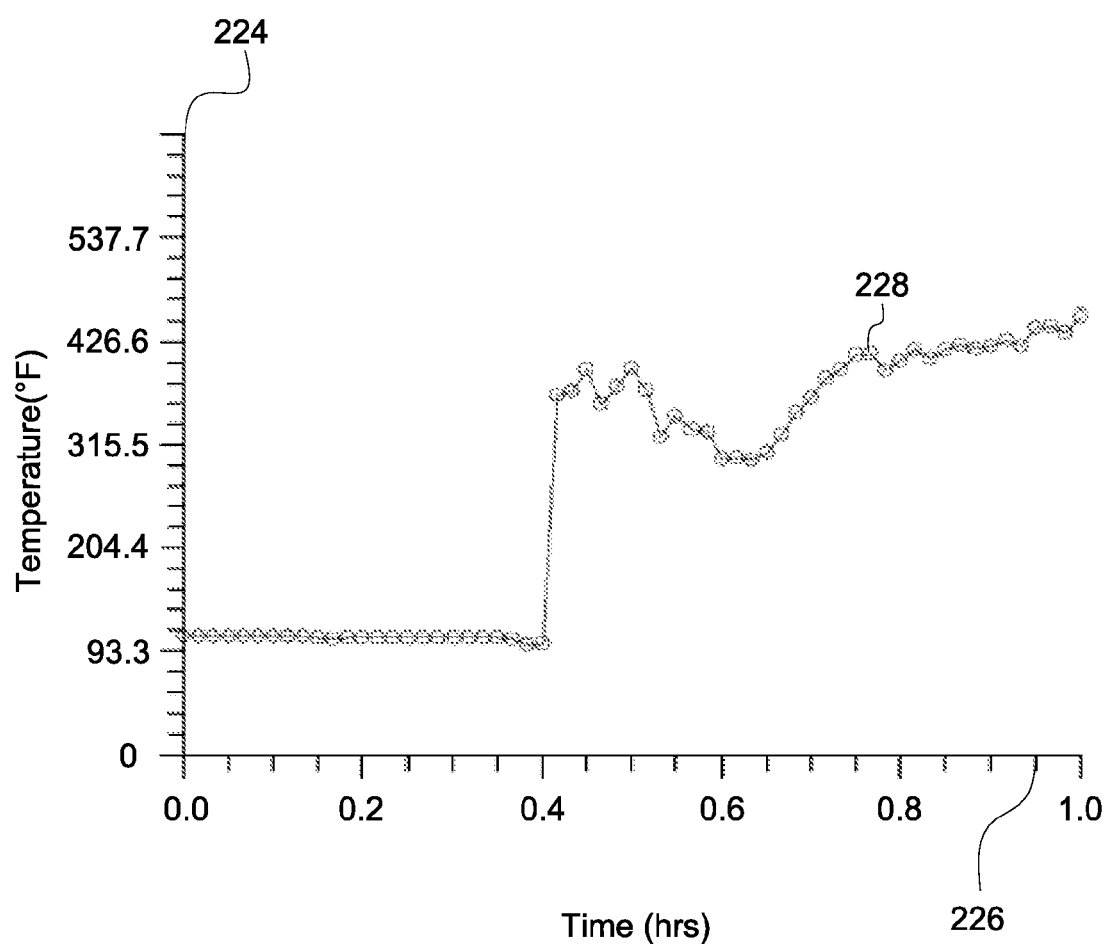
FIG. 18 represents a graphical illustration of the fiber sensing cable responding to gasification environmental thermal fast startup process, in another embodiment disclosed herein.

FIG. 18 is another example of the thermal ramping measurement from the fiber HTFBG sensors. The X-axis 224 represents the temperature during thermal ramping measured at various points by the distributed sensors and the Y-axis represents time 226 in FIG. 16. The line plot 228 demonstrates the fiber sensor is sensitive and responsive to nearly 500° C./min temperature variation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A gasification system comprising:
    a gasifier unit; and
    a harsh environment fiber sensing cable package disposed within the gasifier unit, comprising:
        a thermally conductive enclosure; and
        at least one sensor cable comprising a distributed array of high temperature fiber Bragg grating sensors, wherein the sensors are disposed and hermetically sealed within the thermally conductive enclosure,
        wherein the thermally conductive enclosure comprises thermally conductive filler materials disposed about the sensor cable within the thermally conductive enclosure; said filler materials comprising metal micro-particles and wide-gap micro-particles, wherein voids are present between the metal micro-particles, and the voids are capable of attenuating reflected short-wavelength electromagnetic waves.

2. The gasification system of claim 1, wherein the thermally conductive enclosure comprises a material with a melting point greater than 2000° F. (~1093° C.) and wherein an outer surface of the enclosure reflects at least 50 percent of incident radiation at wavelengths less than 2 microns.

3. The gasification system of claim 1, wherein the thermally conductive enclosure is pressurized by an inert gas filling.

4. The gasification system of claim 1, wherein the sensor cable package further comprises a woven ceramic material disposed around the fiber sensor cable.

5. The gasification system of claim 1, further comprising one or more support fibers disposed about the sensor cable to mechanically support the sensor cable.

6. The gasification system of claim 1, wherein the sensor cable package comprises a plurality of sensor cables, wherein the sensor cables are disposed in a twisted configuration to form a mechanically self supporting fiber sensor bundle.

7. The gasification system of claim 1, wherein the sensor cable package is operable at pressures greater than 500 psi (~3.45 MPa).

8. The gasification system of claim 1, wherein the sensor cable package is operable in and configured to measure temperatures greater than 1000 degree Fahrenheit(~537° C.).

9. The gasification system of claim 1, wherein the sensor cable package is operable in and configured to measure temperatures up to 2000 degree Fahrenheit (~1093° C.).

10. A harsh environment temperature sensing fiber sensor package comprising:
   at least one sensor cable comprising at least one high-temperature fiber Bragg grating sensor; and
   a thermally conductive enclosure comprising:
      a reflective material with a melting point greater than 2000° F. (~1093° C.), wherein the material reflects at least 50 percent of incident radiation at wavelengths less than 2 microns, and
      thermally conductive filler materials disposed about the sensor cable within the thermally conductive enclosure; said filler materials comprising metal micro-particles and wide-gap micro-particles, wherein voids are present between the metal micro-particles, and the voids are capable of attenuating reflected short-wavelength electromagnetic waves,
   wherein the at least one sensor is disposed and hermetically sealed within the thermally conductive enclosure.

11. The fiber sensor package of claim 10, wherein the thermally conductive enclosure comprises a material comprising iron and alloys thereof, nickel and alloys thereof, chromium and alloys thereof, molybdenum and alloys thereof, rhenium and alloys thereof, platinum and alloys thereof, tantalum and alloys thereof, titanium and alloys thereof or combinations thereof.

12. The fiber sensor package of claim 10, wherein the at least one sensor is located in a curved section of the fiber sensor cable and the fiber sensor cable is fixed to an inner surface of the curved section.

13. The fiber sensor package of claim 10, wherein the thermally conductive enclosure is pressurized using a nitrogen gas filling.

14. The fiber sensor package of claim 10, wherein the thermally conductive filler material comprises a wide band gap material.

15. The fiber sensor package of claim 14, wherein the wideband gap material comprises a material comprising silica, quartz, porcelain, alumina, magnesia, hafnia, titanium dioxide, silicon carbide, silicon nitride or combinations thereof.

16. The fiber sensor package of claim 10, wherein the thermally conductive filler material comprises a material comprising Ag, Al, Ni, Cu, Ta, Co, Fe, Mg, stainless steel, Inconel or combinations thereof.

17. The fiber sensor package of claim 10, wherein the sensor cable package further comprises a woven ceramic sleeve disposed around the fiber sensor cable.

18. The fiber sensor package of claim 10, wherein the at least one sensor cable comprises a single-mode fiber sensor cable or a multimode fiber sensor cable.

19. The fiber sensor package of claim 10, wherein the at least one sensor cable comprises a metallized fiber sensor cable.

20. The fiber sensor package of claim 10, wherein the at least one sensor cable comprises a polymerized fiber sensor cable.

21. The fiber sensor package of claim 20, further comprising one or more polymerized support fibers disposed about the sensor cable to mechanically support the polymerized fiber sensor cable.

22. The fiber sensor package of claim 10, wherein the sensor cable package comprises a plurality of sensor cables, wherein the sensor cables are disposed in a twisted configuration to form a mechanically self supporting fiber sensor bundle.

23. A harsh environment temperature sensor system comprising:
   a harsh environment temperature fiber sensor package disposed within the harsh environment, wherein the fiber sensor package comprises a fiber sensor cable at least partially disposed and mechanically supported within a hermetically sealed, thermally conductive high melting point enclosure, wherein the fiber sensor cable comprises one or more fiber Bragg grating sensors and the thermally conductive high melting point enclosure comprises:
      a reflective material with a melting point greater than 2000° F. (~1093° C.), wherein the material reflects at least 50 percent of incident radiation at wavelengths less than 2 microns,
      thermally conductive filler materials disposed about the sensor cable within the thermally conductive enclosure; said filler materials comprising metal micro-particles and wide-gap micro-particles, wherein voids are present between the metal micro-particles, and the voids are capable of attenuating reflected short-wavelength electromagnetic waves,
   an interrogation source disposed external to the harsh environment for generating an interrogation signal, wherein upon interrogation of the fiber sensor cable by the interrogation signal, the sensor generates a response data signal characteristic of a sensed temperature; and
   a signal acquisition and analysis system, wherein the response data signal is acquired by the data acquisition and analysis system to estimate the sensed temperature.

* * * * *